United States Patent
Yang et al.

(10) Patent No.: US 9,778,845 B2
(45) Date of Patent: Oct. 3, 2017

(54) FILE MANAGEMENT SYSTEM

(71) Applicant: HGST Netherlands B.V., Amsterdam (NL)

(72) Inventors: Zhang Yang, Beijing (CN); Wang Hongming, Beijing (CN); Tatsuya Hirai, Tokyo (JP)

(73) Assignee: WESTERN DIGITAL TECHNOLOGIES, INC., Irvine, CA (US)

( * ) Notice: Subject to any disclaimer, the term of this patent is extended or adjusted under 35 U.S.C. 154(b) by 207 days.

(21) Appl. No.: 14/612,085

(22) Filed: Feb. 2, 2015

(65) Prior Publication Data
US 2016/0224245 A1 Aug. 4, 2016

(51) Int. Cl.
G06F 3/06 (2006.01)

(52) U.S. Cl.
CPC ............ G06F 3/0604 (2013.01); G06F 3/064 (2013.01); G06F 3/0643 (2013.01); G06F 3/0644 (2013.01); G06F 3/0673 (2013.01)

(58) Field of Classification Search
None
See application file for complete search history.

(56) References Cited

U.S. PATENT DOCUMENTS

| | | | |
|---|---|---|---|
| 5,629,980 A | 5/1997 | Stefik et al. | |
| 5,715,403 A | 2/1998 | Stefik | |
| 6,032,161 A * | 2/2000 | Fuller | G06F 3/0607 |
| 7,155,558 B1 * | 12/2006 | Vaghani | G06F 3/0607 |
| | | | 711/117 |
| 7,222,104 B2 | 5/2007 | Tadayon et al. | |
| 7,389,270 B2 | 6/2008 | Stefik et al. | |
| 7,669,032 B2 | 2/2010 | Karr et al. | |
| 7,870,116 B2 | 1/2011 | Olsen | |
| 7,937,545 B1 * | 5/2011 | Wu | G06F 11/1448 |
| | | | 709/219 |
| 8,055,864 B2 | 11/2011 | Sawdon et al. | |
| 8,230,343 B2 | 7/2012 | Logan et al. | |
| 8,244,579 B2 | 8/2012 | Wang et al. | |

(Continued)

FOREIGN PATENT DOCUMENTS

| | | |
|---|---|---|
| CN | 1661568 | 8/2005 |
| WO | 2012164570 | 6/2012 |

OTHER PUBLICATIONS

SAFIA License Group, Security Architecture for Intelligent Attachment Device Specifications, Protocol and Data Structure vol. 1, http://www.safia-lb.com/doc/spec/SAFIA_PDS1_V121-20101022.pdf, Version 1.21, Oct. 2010.

SAFIA License Group, Security Architecture for Intelligent Attachment Device Specifications, Interface for iVDR, http://www.safia-lb.com/doc/spec/SAFIA_IF_V122-20110916.pdf, Version 1.22, Sep. 2011.

(Continued)

*Primary Examiner* — Yaima Rigol
(74) *Attorney, Agent, or Firm* — Kunzler Law Group, PC

(57) ABSTRACT

Disclosed herein is a file management system that includes an unformatted raw data area storing a plurality of raw data files at respective locations within the unformatted raw data area. The storage medium also includes a formatted partitioned area that includes a plurality of partitions each associated with a different file system. Each partition includes a plurality of metadata files each corresponding with one of the plurality of raw data files. Each metadata file includes metadata regarding the corresponding one of the plurality of raw data files.

21 Claims, 8 Drawing Sheets

(56) References Cited

U.S. PATENT DOCUMENTS

| | | | |
|---|---|---|---|
| 8,429,516 B1* | 4/2013 | Riggs | G06F 21/6254 |
| | | | 715/201 |
| 2003/0018871 A1* | 1/2003 | March | G06F 3/08 |
| | | | 711/173 |
| 2006/0195672 A1* | 8/2006 | Inoue | G06F 3/0607 |
| | | | 711/170 |
| 2007/0219917 A1 | 9/2007 | Liu et al. | |
| 2008/0065770 A1 | 3/2008 | Romero et al. | |
| 2009/0182786 A1* | 7/2009 | Haanpaa | G06F 17/30979 |
| 2012/0017043 A1 | 1/2012 | Aizman et al. | |
| 2012/0239612 A1 | 9/2012 | George et al. | |
| 2012/0254257 A1* | 10/2012 | Mitra | G06F 17/30129 |
| | | | 707/803 |
| 2014/0136513 A1* | 5/2014 | Ailamaki | G06F 17/30336 |
| | | | 707/718 |

OTHER PUBLICATIONS

Stefik et al., The Bit and the Pendulum: Balancing the Interests of Stakeholders in Digital Publishing, Xerox Palo Alto Research Center, 1997, Palo Alto, CA.
Specialization MRI, http://www.supelec.fr/222_p_14710/program-specializaiton-mri.html accessed Oct. 14, 2013.
GDF Suez Commitments, Contract for the transfer of usage rights of transit capacity, Feb. 2010.
Chen et al., Group-based Authentication to Protect Digital Content for Business Applications, p. 1-19, http://www.microsoft.com/windowsserver2003/techinfo/overview/rmsverticals.m.spx.
Gaber, Support Consumers' Rights in DRM: A Secure and Fair Solution to Digital License Reselling Over the Internet, School of Computer Science, 2012, University of Manchester.

* cited by examiner

FILE MANAGEMENT SYSTEM

FIELD

This disclosure relates generally to file management systems, and more particularly to file management systems that store digital content in multiple file systems.

BACKGROUND

File management systems are systems, such as operating systems or programs, which manage the storage and retrieval of digital content. The structure and logic rules used by file management systems to manage groups of digital content are defined as a file system. Different file systems use different structures and logic rules to separate, organize, and identify digital content. Common file systems include ISO 9660, file allocation table (FAT), universal disk format (UDF), NTFS, and the like. Some file management systems employ a single type of file system to control how digital content is stored and retrieved by the file management system. Other file management systems may utilize multiple types of file systems when controlling the storage and retrieval of digital content.

SUMMARY

The subject matter of the present application has been developed in response to the present state of the art, and in particular, in response to problems and shortcomings of conventional file management systems that have not yet been fully solved by currently available systems. Conventional host devices and associated digital content players may recognize no more than one file system, or at best a limited number of file systems. When digital content is stored in a recognized file system, the host device is able to access and retrieve the digital content. However, if the host device does not recognize the file system, the host device cannot access and retrieve the digital content. Often, one host device may have multiple digital content players each recognizing different file systems.

One method to address such file system incompatibility issues would be to record digital content in multiple separate storage devices each formatted with a different file system. The host device or associated user would then select the storage device with the file system that is compatible with a particular application or player operated by the host device. Such a method, or associated system, would require an excessive number of storage devices, which would drive upwardly management costs and time.

Another method to address file system incompatibility issues would be to partition a single storage device into multiple partitions, format each partition to have a different file system, and record a separate and full copy of the digital content in each of the multiple partitions. Because this method requires redundant copies of digital content, its implementation would result in wasted storage space, and thus a significant increase in cost.

In view of the limitations of today's host devices, the availability and use of many varieties of file systems, and lack of acceptable solutions, it may be desirable to improve the compatibility of host devices with multiple types of file systems without unduly increasing costs and/or wasting storage space. In general, the subject matter of the present application has been developed to provide a file management system that overcomes at least some of the above-discussed shortcomings of the prior art.

According to one embodiment, a storage medium for a file management system includes an unformatted raw data area storing a plurality of raw data files at respective locations within the unformatted raw data area. The storage medium also includes a formatted partitioned area that includes a plurality of partitions each associated with a different file system. Each partition includes a plurality of metadata files each corresponding with one of the plurality of raw data files. Each metadata file includes metadata regarding the corresponding one of the plurality of raw data files.

In some implementations of the storage medium, the metadata of each metadata file includes a location of the raw data file within the unformatted raw data area. The location includes a physical address of a starting point and an ending point of the raw data file within the unformatted raw data area.

According to certain implementations of the storage medium, a size of each partition varies based on the file system associated with the partition. The file systems of the plurality of partitions can be selected from the group consisting of universal disk format, file allocation table, and high performance. The storage medium may further include partition management blocks.

In another embodiment, a file management system includes a storage device with a storage medium with an unformatted raw data area storing a raw data file. The storage device also includes a formatted partitioned area that includes a first partition with a first file system and a second partition with a second file system that is different than the first file system. The first partition stores a first metadata file including metadata regarding the raw data file and the second partition stores a second metadata file including metadata regarding the raw data file. The file management system further includes a digital content player that plays the raw data file. The digital content player is configured to determine a location of the raw data file within the unformatted raw data area based on one of the first and second metadata files.

According to some implementations of the file management system, the digital content player is incapable of reading files from the second file system. The digital content player can determine the location of the raw data file within the unformatted raw data area based on the first metadata file. The digital content player can be a first digital content player configured to determine the location of the raw data file within the unformatted raw data area based on the first metadata file. The file management system can also include a second digital content player that executes the raw data file. The second digital content player can be incapable of reading files from the first file system and configured to determine the location of the raw data file within the unformatted raw data area based on the second metadata file.

In certain implementations of the file management system, the metadata regarding the raw data file of the first and second metadata files is the same. In some implementations, the metadata regarding the raw data file of the first and second metadata files includes a starting point and an ending point of the raw data file within the unformatted raw data area.

According to some implementations, the file management system further includes a digital content manager that stores the raw data file in the unformatted raw data area, generates the first and second metadata files, and stores the first and second metadata files in the first and second partitions, respectively. The digital content manager can format the first partition according to the first file system and format the second partition according to the second file system.

In yet another embodiment, a method for managing files includes parsing a partition of a plurality of partitions formatted into a storage medium. Each partition is formatted according to a different file system. The method also includes locating a metadata file stored in the partition, and obtaining a location in an unformatted area of the storage medium of a raw data file from the metadata file. Additionally, the method includes reading the raw data file from the unformatted area of the storage medium.

According to some implementations of the method, each partition of the plurality of partitions includes a metadata file. Each metadata file includes the location in the unformatted area of the storage medium of the raw data file.

In some implementations, the method can additionally include receiving a request to read the raw data file from a digital content player. The digital content player can be capable of parsing the file system of the partition of the plurality of partitions, but incapable of parsing the file system of at least another of the partitions of the plurality of partitions. The method can include selecting the partition to parse from the plurality of partitions based on the file system of the partition.

According to certain implementations, the method can include, prior to parsing the partition, writing the raw data file into the unformatted area of the storage medium, and writing a metadata file into each of the plurality of partitions according to the file system associated with each partition. Each metadata file can include a starting point and an ending point of the raw data file in the unformatted area of the storage medium. The method may additionally include writing the starting point and end point into a main memory before writing the metadata file into each of the plurality of partitions.

In some implementations of the method, the partition is a first partition and the metadata file is a first metadata file. The method can further include parsing a second partition of the plurality of partitions, locating a second metadata file stored in the second partition, and obtaining the location in the unformatted area of the raw data file from the second metadata file.

According to some implementations, the method can include writing a location of the metadata file into a main memory of the storage medium and writing an updated raw data file into the unformatted area. The updated raw data file can include an update to the raw data file. The method may further include writing a location of the updated raw data file in the unformatted area into the main memory. Additionally, the method can include modifying the metadata file to reflect the location of the updated raw data file in the unformatted area based on the location of the metadata file written into the main memory.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not therefore to be considered to be limiting of its scope, the subject matter will be described and explained with additional specificity and detail through the use of the drawings, in which.

DETAILED DESCRIPTION

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

Figure 1:
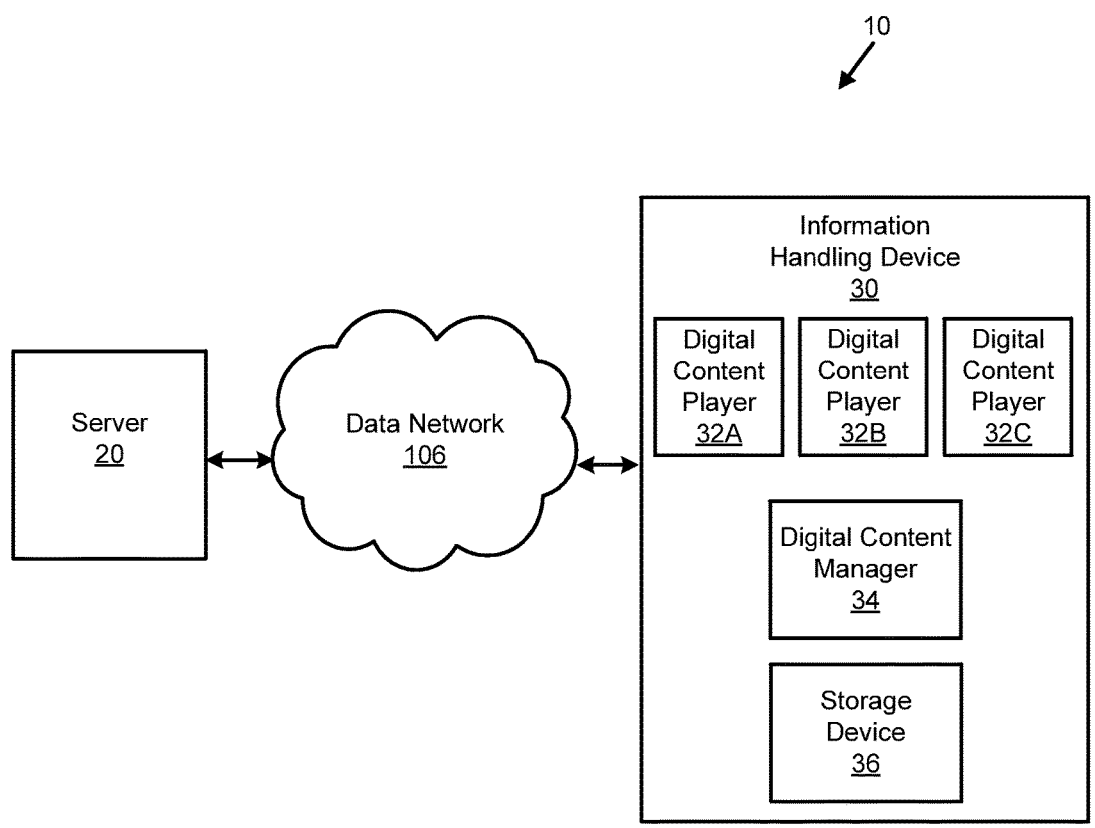
FIG. 1 is a schematic block diagram illustrating one embodiment of a file management system.

FIG. 1 illustrates one embodiment of a file management system 10. The system 10 includes a server 20, an information handling device 30, and a data network 40, which are described in more detail below. Although the file management system 10 illustrated in FIG. 1 includes a certain number and intercommunication configuration of elements, such as one server 20 and one information handling device 30 communicable with each other over one data network 40, in other embodiments, the system can include any number of and intercommunication configuration of elements as desired without departing from the essence of the present disclosure.

The server 20 can be one or more servers. The server 20, in one embodiment, can be one or more main frame computers, desktop computers, laptop computers, cloud servers, smart phones, tablet computers, and the like.

The data network 40, in certain embodiments, is a digital communication network that transmits digital communications between the information handling device 30 and the server 20. In some implementations, the data network 40 may include a wireless network, such as a wireless telephone network, a local wireless network, such as a Wi-Fi network, a Bluetooth® network, and the like. In yet some implementations, the data network 40 may include a wide area network ("WAN"), a storage area network ("SAN"), a local area network ("LAN"), an optical fiber network, the internet, or other digital communication network known in the art. The data network 40 may include two or more networks. Further, the data network 40 may include one or more servers, routers, switches, and/or other networking equipment. The data network 40 may also include computer readable storage media, such as a hard disk drive, an optical drive, non-volatile memory, random access memory ("RAM"), or the like.

The information handling device 30, in one embodiment, may include one or more mobile computing devices, such as smart phones, tablet computers, laptops, optical head mounted displays, smart watches, and/or the like. In another embodiment, the information handling device 30 can include one or more immobile or stationary computing devices, such as desktop computers, servers, and/or the like. In some embodiments, the information handling device 30 includes operating systems, such as various versions of mobile and desktop operating systems provided by Microsoft®, Apple®, Linux, Android, and/or the like. For example, the information handling device 30 may include a tablet running a version of Apple® iOS, a smart phone running a version of Windows® Mobile, or a laptop running a distribution of Linux. In one embodiment, the information handling device 30 is communicatively coupled to the server 20 through the data network 40. The information handling device 30 can access data stored on or transmitted from the server 20 through the data network 40.

In the illustrated embodiment of FIG. 1, the information handling device 30 includes a plurality of digital content players 32A-C, a digital content manager 34, and a storage device 36. The features of the digital content players 32A-C, digital content manager 34, and storage device 36 are described in more details below. However, in general, each digital content player 32A-C is configured to play (e.g., execute, read, access, etc.) digital content stored by the storage device 36. In one implementation, each digital content player 32A-C, which can be any of various software, firmware, and/or hardware elements that execute any of various programs and/or applications, recognizes different file systems. For example, the digital content player 32A may recognize only a first file system, the digital content player 32B may recognize only a second file system, and the digital content player 32C may recognize only a third file system. The digital content is stored by the storage device 36 in a manner that promotes compatibility between the digital content players 32A-C and the stored digital content without unduly increasing costs and/or wasting storage space. The digital content manager 34 controls the writing of data (e.g., raw data files and metadata files) to the storage device 36, and the modification of data written to the storage device. In certain implementations, the information handling device 30 can include fewer, such as one, or more than three digital content players, and/or more than one digital content manager 134 and storage device 136.

In one embodiment, digital content is transferred from the server 20 to the information handling device 30 via the data network 40. Prior to being transferred to the information handling device 30, the digital content may be initially stored on the server 20 or on any of various storage devices accessible by the server. The digital content manager 34 of the information handling device 30 then controls the storage onto the storage device 36 of the digital content received from the server 20.

Although the information handling device 30 includes the digital content manager 34 and the storage device 36, in some embodiments, the digital content manager 34 and/or the storage device 36 can be separated from the information handling device 30. For example, the digital content manager 34 and/or the storage device 36 can be located on the server 20, or other device, that is remote from the information handling device 30 and communicable with the digital content players 32A-C of the information handling device via the data network 40.

Additionally, although the file management system 10 includes a single information handling device 30 with multiple digital content players 32A-C, in some embodiments, the file management system may include multiple handling devices 30 each with one or multiple digital content players. In such embodiments, each information handling device 30 may include its own digital content manager 34 and/or storage device 36. However, in one particular embodiment, the file management system 10 includes multiple information handling devices 30 each with at least one digital content player, and the digital content manager 34 and storage device 36 are centrally located remotely away from the information handling devices, such as on the server 20, and communicable with the information handling devices over the data network 40.

Figure 2:
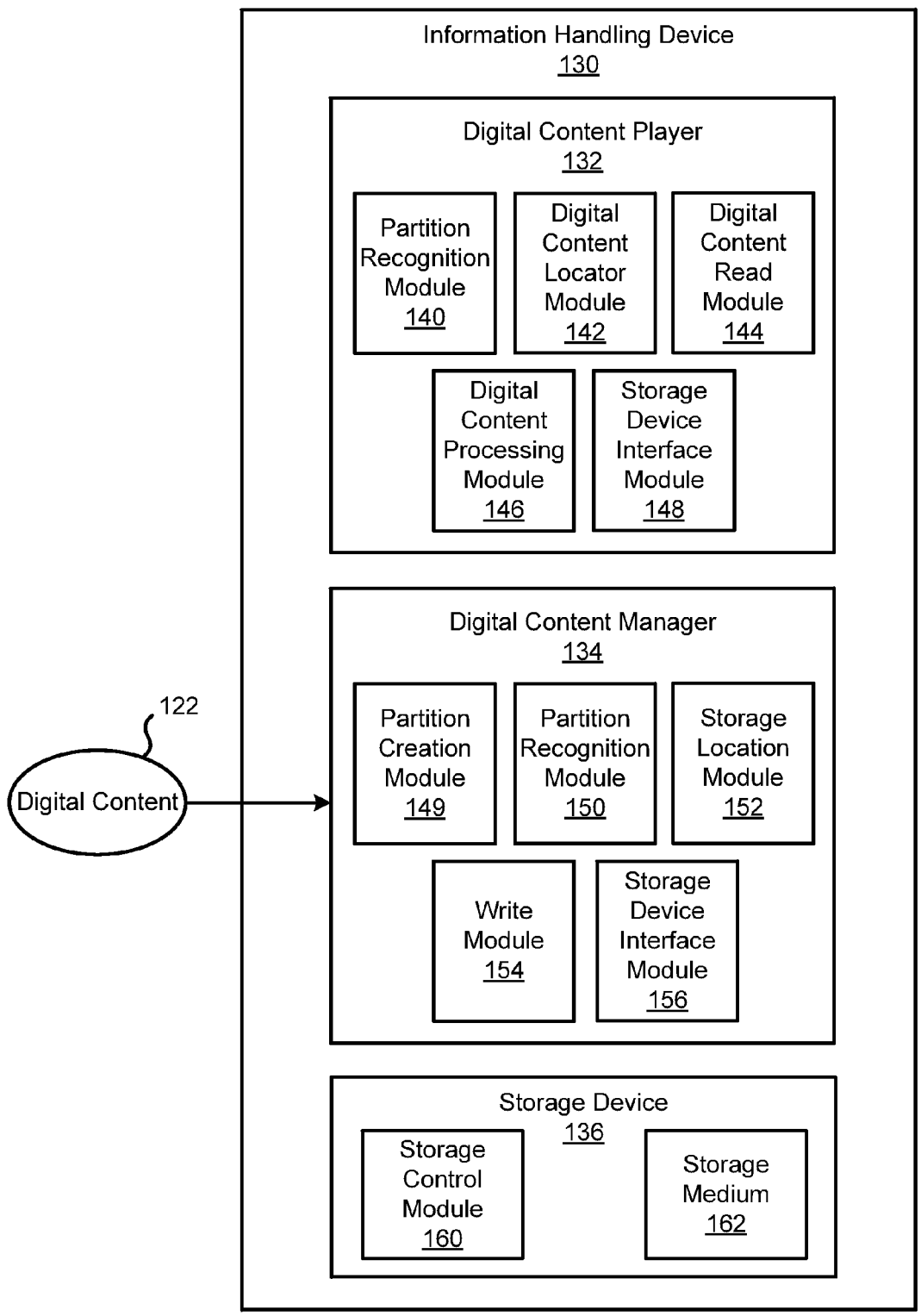
FIG. 2 is a schematic block diagram illustrating one embodiment of an information handling device.

Referring to FIG. 2, one embodiment of an information handling device 130 is shown. The features of the information handling device 130 are similar to analogous features of the information handling device 30 of FIG. 1, with like numbers referring to like features. The information handling device 130 includes a digital content player 132, digital content manager 134, and storage device 136. Although the information handling device 130 includes one digital content player 132, one digital content manager 134, and one storage device 136, in some embodiments, the information handling device 130 can include more than one digital content player 132, digital content manager 134, and storage device 136. Additionally, the digital content manager 134 and/or storage device 136 can be located remote from the information handling device 130, and communicate with the information handling device over a data network to accomplish the same functionality as the illustrated embodiment of FIG. 2.

The digital content player 132 includes several modules. In the illustrated embodiment, the digital content player 132 includes a partition recognition module 140, digital content locator module 142, digital content read module 144, digital content processing module 146, and storage device interface module 148. The various modules may communicate with each other to cooperatively provide the functionality of the digital content player 132. Generally, the storage device interface module 148 interfaces with the storage device 136 to facilitate communication with and access to the storage device.

Figure 3:
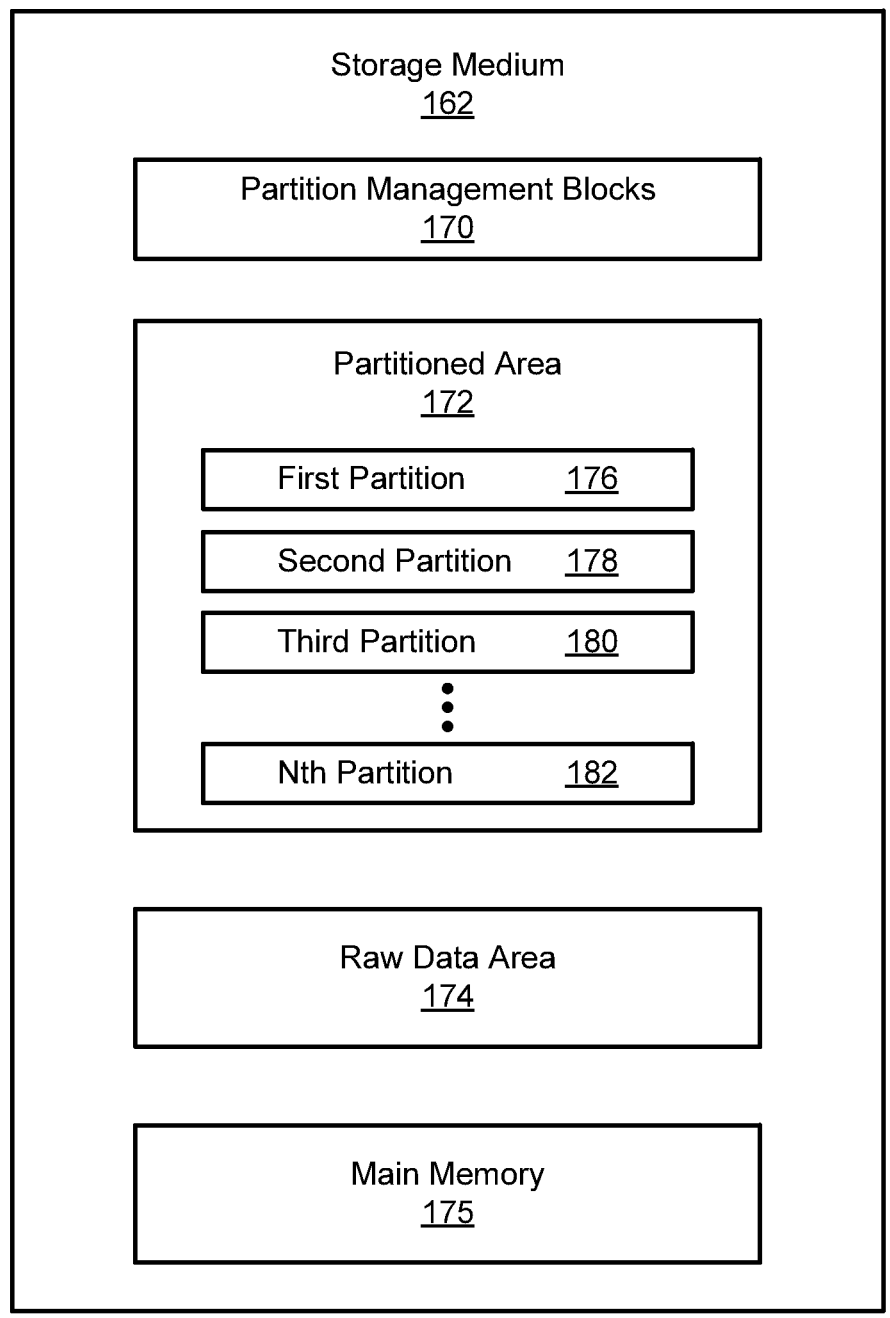
FIG. 3 is a schematic block diagram illustrating one embodiment of a storage medium.

The partition recognition module 140 is configured to detect the types of file systems supported by the storage device 136 and determine whether the storage device supports a file system recognized by the digital content player 132. In some implementations, the partition recognition module 140 finds partitions formed in a storage medium 162 of the storage device 136, detects the file system used within each partition, and determines whether a partition of the storage medium 162 uses a file system that is compatible with the digital content player 132. Referring to FIG. 3, the partitions can be first through N partitions 176-182 formed in a partitioned area 172 of the storage medium 162. Each partition 176-182 is formatted to employ a different file system for organizing data files stored in the partitions. For example, the first partition 176 may be formatted according to a first file system, the second partition 178 may be formatted according to a second file system, the third partition 180 may be formatted according to a third file system, and the Nth partition 182 may be formatted according to an Nth file system. Each of the first through Nth file systems are different from the other of the first through Nth file systems. Although the partitioned area 172 of the illustrated storage medium 162 is shows four partitions, in other embodiments, the partitioned area can have any number of partitions, as indicated by the use of an Nth partition, each having a respective one of any number of file systems. In this manner, the storage medium 162 accommodates the compatibility of the storage device 136 with digital content players that recognize any number of file systems.

The digital content locator module 142 is configured to locate digital content within a partition of the storage medium 162 that uses a file system recognized by the digital content player 132. The digital content located by the digital content locator module 142 corresponds with a request by the digital content player 132 to access (e.g., read or play) the digital content. The digital content locator module 142 may access a partition management block 170 of the storage medium 162 to determine the location of a metadata file within the partition using the recognized file system. Accordingly, the known location of the metadata file is provided in terms of the hierarchy and organization of the particular file system recognized by the digital content player 132.

Figure 4:
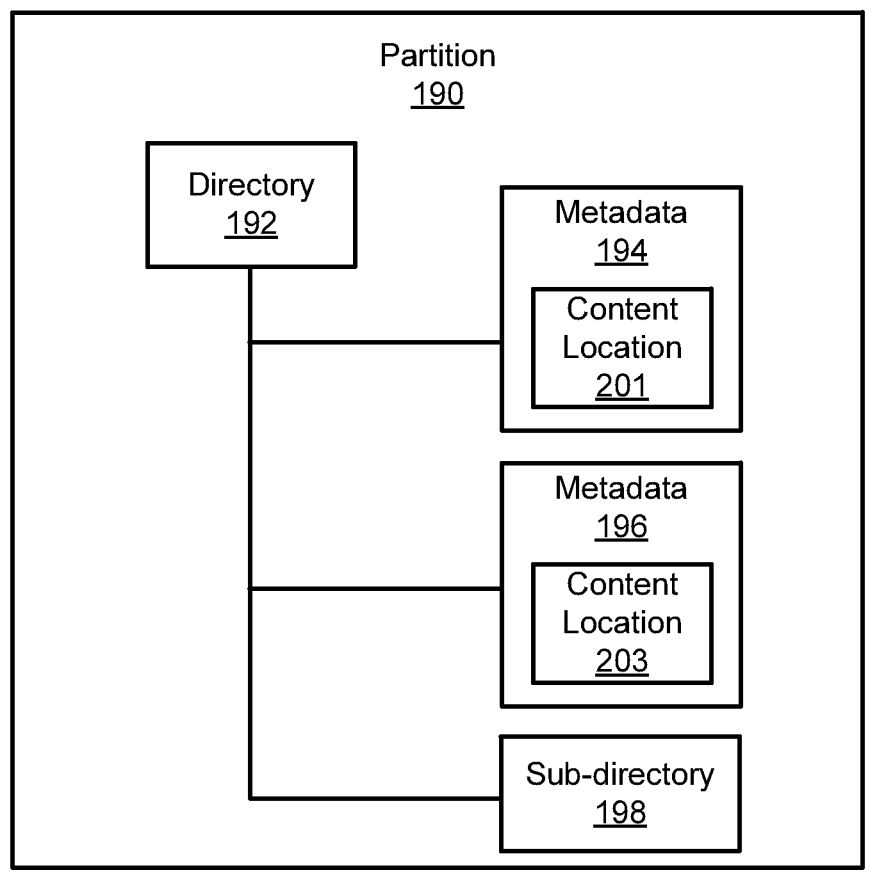
FIG. 4 is a schematic block diagram illustrating one embodiment of a partition of a storage medium.
Figure 5:
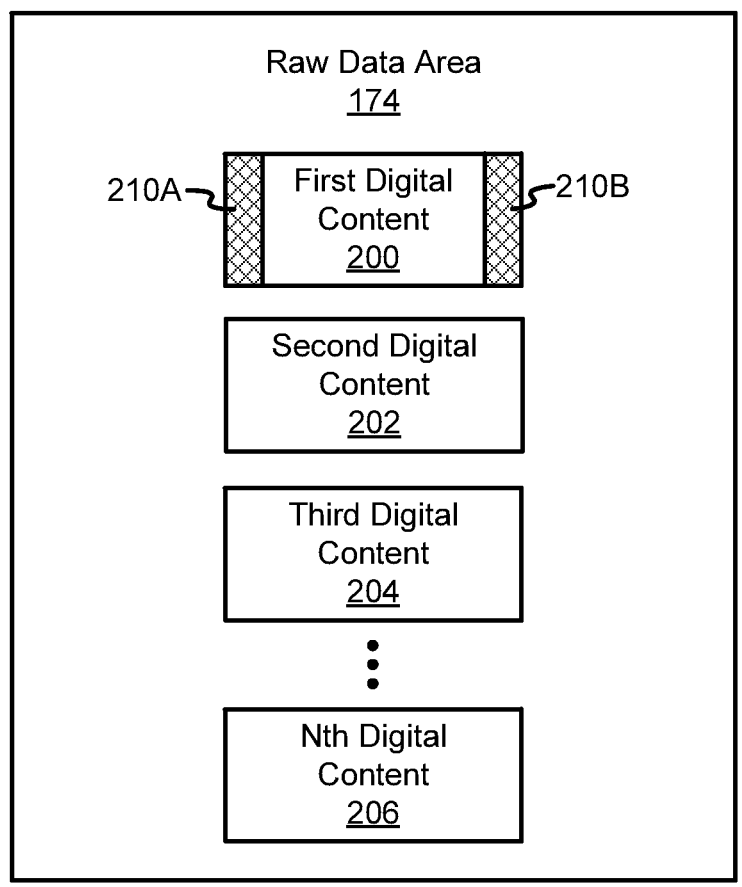
FIG. 5 is a schematic block diagram illustrating one embodiment of a raw data area of a storage medium.

As shown in FIG. 4, a partition 190, which may represent each of the partitions 176-182, employs a file system that identifies, categorizes, and organizes files in a particular way. Generally, file systems follow some organizational methodology that includes directories 192, files (e.g., metadata files 194, 196) organized under a directory, and sub-directories 198 also organized under a directory. Therefore, the location of the metadata file provided by the partition management block 170 can be provided in terms of the hierarchal path of directories and sub-directories to the metadata file.

Knowing the location of the metadata file in the compatible partition, the digital content locator module 142 parses the file system of the partition to locate and access the metadata file. The metadata file (e.g., one of metadata files 194, 196) includes content location information (e.g., content location 201, 203 respectively) regarding the location of a raw data file containing the requested digital content within an unformatted raw data area of the storage medium 162. In certain implementations, the requested digital content is defined as the raw data file and vice versa. The content location information in the metadata file can include a starting point and ending point of the raw data file in the unformatted raw data area of the storage medium. In the illustrated embodiment, for example, the metadata file 194 can include content location information 201 that identifies a starting point 210A and an ending point 210B of a first digital content file 200 stored in the raw data area 174 of the storage medium 162.

Based on the location of the digital content file or raw data file obtained from the associated metadata file, the digital content locator module 142 locates the digital content file in the raw data area 174. The digital content read module 144 then reads the digital content file from the raw data area 174, and the digital content processing module 146 performs an operation based on the digital content file. In one implementation, the digital content processing module 146 executes the digital content file. In another implementation, the digital content file can be a multimedia file and the digital content processing module 146 plays the multimedia file. The digital content read module 144 may temporarily or permanently store a copy of the digital content file in memory outside the raw data area 174 prior the digital content processing module 146 performing the operation based on the digital content file.

Referring back to FIG. 2, the digital content manager 134 includes a partition creation module 149, partition recognition module 150, storage location module 152, write module 154, and storage device interface module 156. The various modules of the digital content manager 134 may communicate with each other to cooperatively provide the functionality of the digital content manager. Generally, the digital content manager 134 interfaces with the storage device 136 via the storage device interface module 156 to format the storage medium 162 and write data to the storage medium 162.

The digital content manager 134 may also interface with the server 20 to receive digital content 122 over the data network 40. Prior to, or after, receiving digital content 122, the partition creation module 149 effectively divides the storage medium 162 into several sections. The storage medium 162 can be one or more data storage media, such as a magnetic recording medium of a hard disk drive, a disk of an optical drive, non-volatile memory, RAM, and/or the like. In the illustrated embodiment, the partition creation module 149 designates separate portions of the storage medium 162 for partition management blocks 170, the partitioned area 172, the raw data area 174, and the main memory 175. The partition management blocks 170 contain information or data regarding the partitions created in the partition area 172. The information can include the types of file systems of each partition, as well as location information for metadata stored in the partitions. Accordingly, the partition creation module 149 is configured to create the partition management blocks 170, and the write module 154 is configured to write information to the blocks associated with the location of metadata files within the partitions, and information regarding the partitions themselves after the partition and associated file systems are known or formatted.

The partition creation module 149 also is configured to partition the partitioned area 172 of the storage medium 162 into a plurality of partitions. Each partition occupies a designated section of the partitioned area 172. The size of the designated section, or the amount of memory designated for each partition, is based on the type of file system associated with the partition. The partition creation module 149 partitions the partitioned area 172 into any number of partitions based on a desired number of file systems to be represented. In the illustrated embodiment, the partition creation module 149 creates at least first, second, third partitions 176-180, and at least one partition 182 above three. After designating separate sections of the partitioned area 172 for the plurality of partitions, the partition creation module 149 formats each partition to have a different file system. For example, the partition creation module 149 may format the first partition 176 to have a first file system (e.g., a file allocation table file system), format the second partition 178 to have a second file system (e.g., universal disk format file system), and format the third partition 180 to have a third file system (e.g., ISO 9660 file system).

The partition recognition module 150 is configured to detect and recognize the partitions in the partition area 172, including the different file systems associated with each partition. In certain implementations, the partition recognition module 150 also may detect and recognize the raw data area 174 and main memory 175 of the storage medium 162.

The storage location module 152 is configured to determine where to store data in the storage medium 162. The data includes a raw data file and associated metadata files that correspond with digital content 122 received from the server 20. Based on the determination of the storage location module 152, the write module 154 writes data onto the storage medium 162. Generally, the storage location module 152 instructs the write module 154 to write raw data files to the raw data area 174 and write the locations of the raw data files in the raw data area to the main memory 175. The storage location module 154 also instructs the write module 154 to write metadata files to the partitions in the partitioned area 172. More specifically, for each raw data file written to the raw data area 174, the write module 154 writes a corresponding metadata file in each of the partitions. For each partition, the write module 154 writes the metadata file to the partition according to the particular file system associated with the partition. The metadata file can contain any of various information about the associated raw data file. In some implementations, the metadata file includes the location (e.g., starting point and ending point) of the raw data file in the raw data area 174. The location of the raw data file can be obtained from the main memory 175. In certain implementations, after the metadata files are written to the partitions, the location of the raw data file stored in the main memory 175 is deleted.

The digital content manager 134 can also facilitate updates to the data stored on the storage medium 162. Generally, when updated or modified digital content 122 is received, the storage location module 152 is configured to locate the raw data file (e.g., digital content) in the raw data area 174, and the write module 154 is configured to replace or modify the raw data file. The storage location module 152 can also locate the metadata files associated with the original raw data file in the partitions, and the write module 154 may write the location of the metadata files in the main memory 175. After the original raw data file is replaced by the modified raw data file or the original raw data file is modified by the write module 154, the write module can write the location of the modified raw data file in the raw data area 174 to the main memory 175. Then, the write module 154 can utilize the stored location in the main memory 175 of the metadata files to modify the metadata files in the partitions to reflect the modifications to the original raw data file.

The storage device 136 can include a storage control module 160 that controls the writing of data to and reading of data from the storage medium 162 based on requests from the digital content manager 134 and digital content player 132, respectively. Generally, the storage control module 160 interfaces with the storage device interface modules 148, 156 of the digital content player 132 and digital content manager 134, respectively. In this manner, the storage medium 162 accommodates the compatibility of the storage device 136 with digital content players that recognize any number of file systems without unduly increasing costs and/or wasting storage space.

Figure 6:
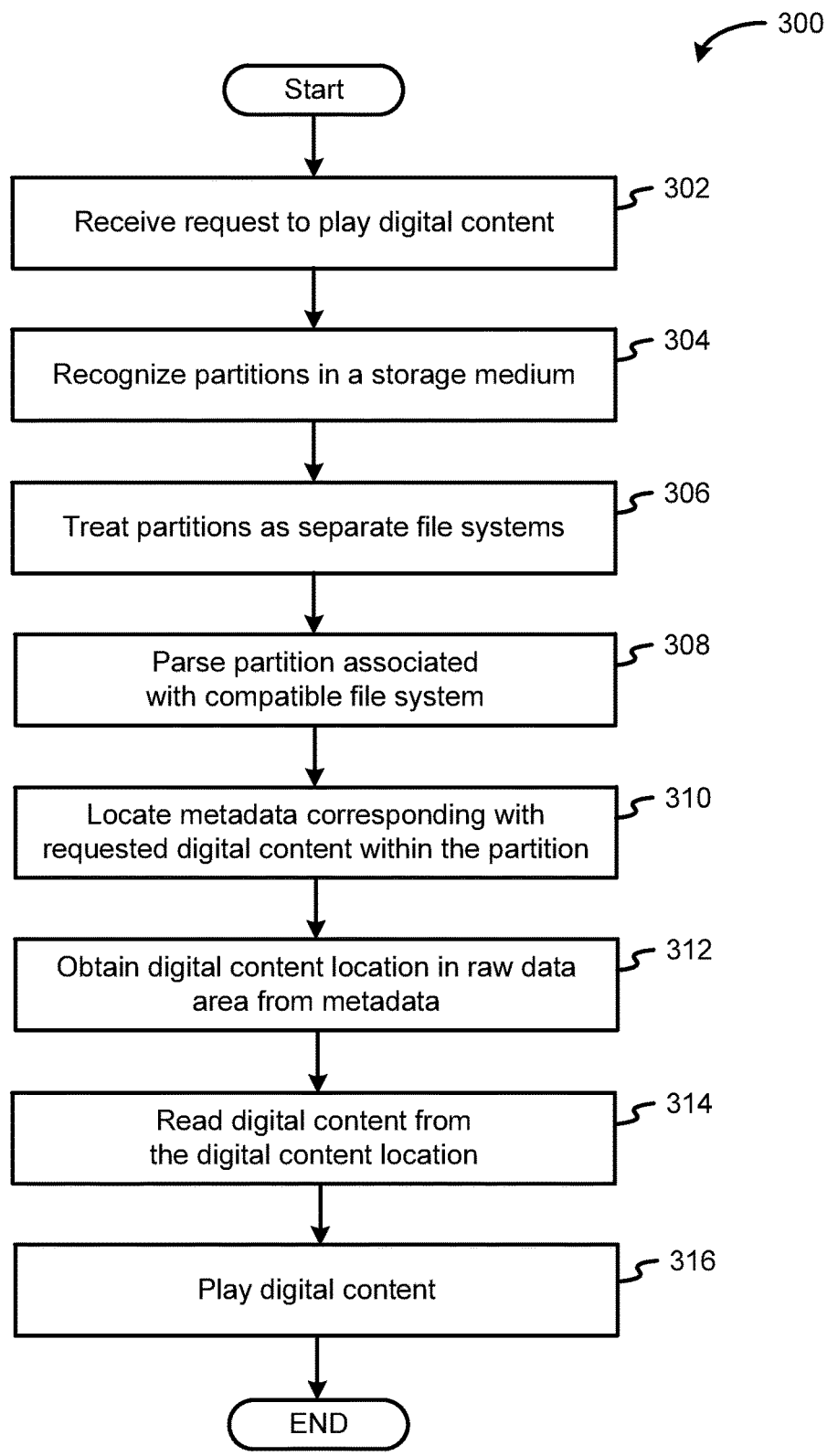
FIG. 6 is a schematic flow diagram illustrating one embodiment of a method for managing files.

Referring to FIG. 6, one embodiment of a method 300 for managing files is shown. The method 300 can be associated with requesting and playing a raw data file previously stored in a storage medium. In one implementation, the method 300 can be executed by the file management system and associated modules and devices described and shown above. The method 300 starts by receiving a request to play digital content at 302. The digital content can be a digital content file or raw data file. The method 300 also recognizes partitions in a storage medium at 304 and treats the recognized partitions as separate file systems at 306. Also, the method 300 parses a partition associated with a compatible file system at 308. The compatible file system can be a file system that is recognized by or compatible with a device or player that requested to play the digital content at 302. The partition is parsed at 308 in order to locate metadata (e.g., a metadata file) within the partition that corresponds with the requested digital content at 310. The metadata can be accessed or opened to obtain the location within a raw data area of the storage medium of the requested digital content at 312. The method 300 then includes locating the requested digital content within the raw data area based on the location obtained from the metadata, and reading the requested digital content from its location within the raw data area at 314. Finally, the method includes playing the digital content read from the raw data area at 316, and the method ends. In some implementations, playing the digital content can include executing, running, or performing some functionality associated with the digital content.

Figure 7:
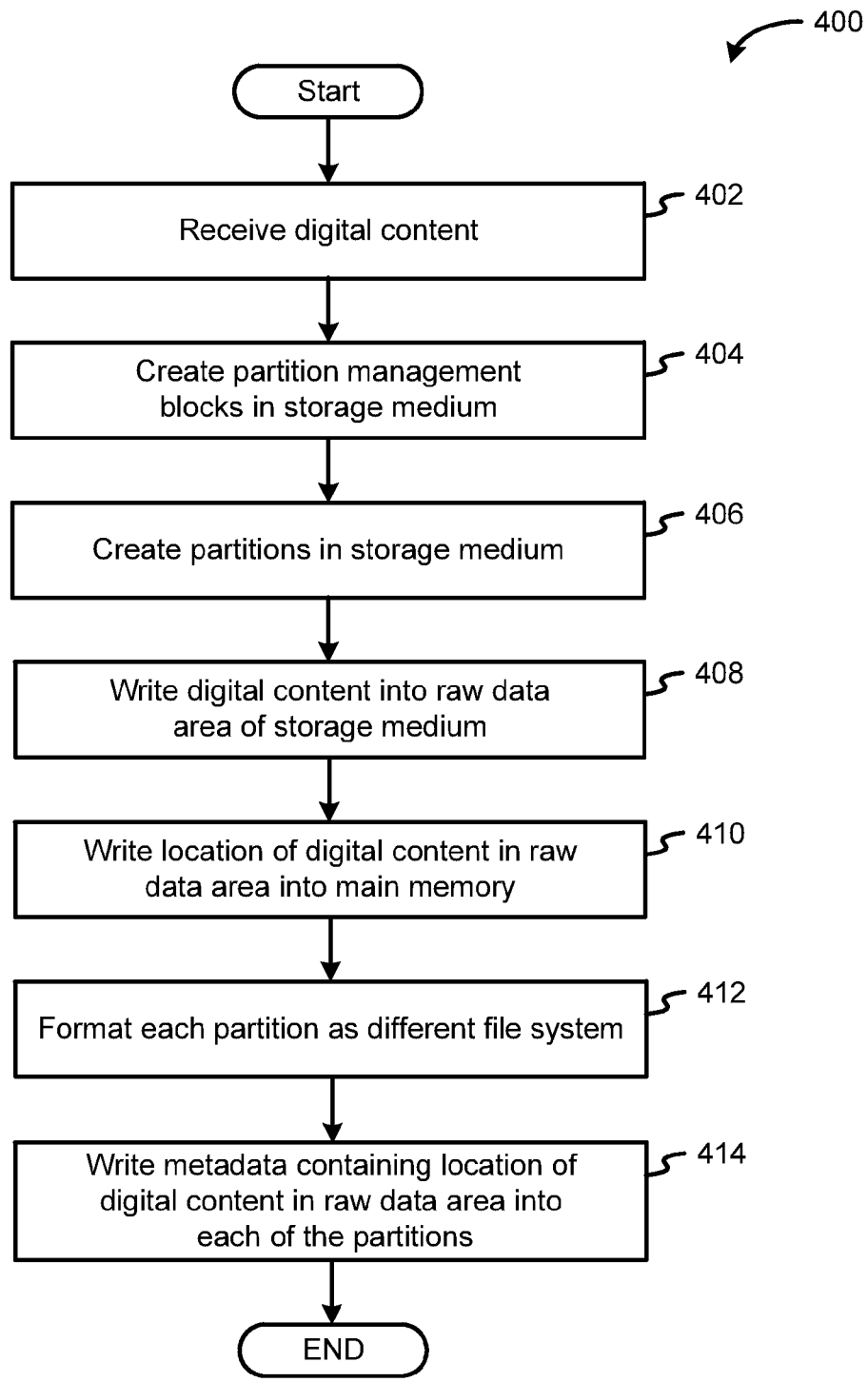
FIG. 7 is a schematic flow diagram illustrating another embodiment of a method for managing files.

Referring to FIG. 7, one embodiment of a method 400 for managing files is shown. The method 400 can be associated with receiving and storing digital content files or raw data files in a storage medium. In one implementation, the method 400 can be executed by the file management system and associated modules and devices described and shown above. The method 400 starts by receiving digital content at 402, such as from a server or other provider of digital content. Additionally, the method 400 creates at least one partition management block in a storage medium at 404, and creates partitions in the storage medium at 406. The method 400 then writes the received digital content, which can be a digital content file or raw data file, into a raw data area of the storage medium at 408. In certain implementations, the method 400 writes the location of the digital content (e.g., location of the digital content in raw data area) to a main memory separate from the raw data area and partitions at 410. The main memory can be a designated portion of the storage medium, or other local or remote storage device. The method 400 also includes formatting each partition as a different file system at 412. After the location of the digital content is written to the main memory at 410, the method 400 can include writing metadata containing the location of the digital content to each of the partitions at 414, and the method ends. Writing the metadata to the partitions at 414 may include updating the partition management blocks with location information of the metadata in the respective partitions, as well as writing the metadata to locations within the partitions according to the organizational and hierarchal methodology of the respective file systems.

Figure 8:
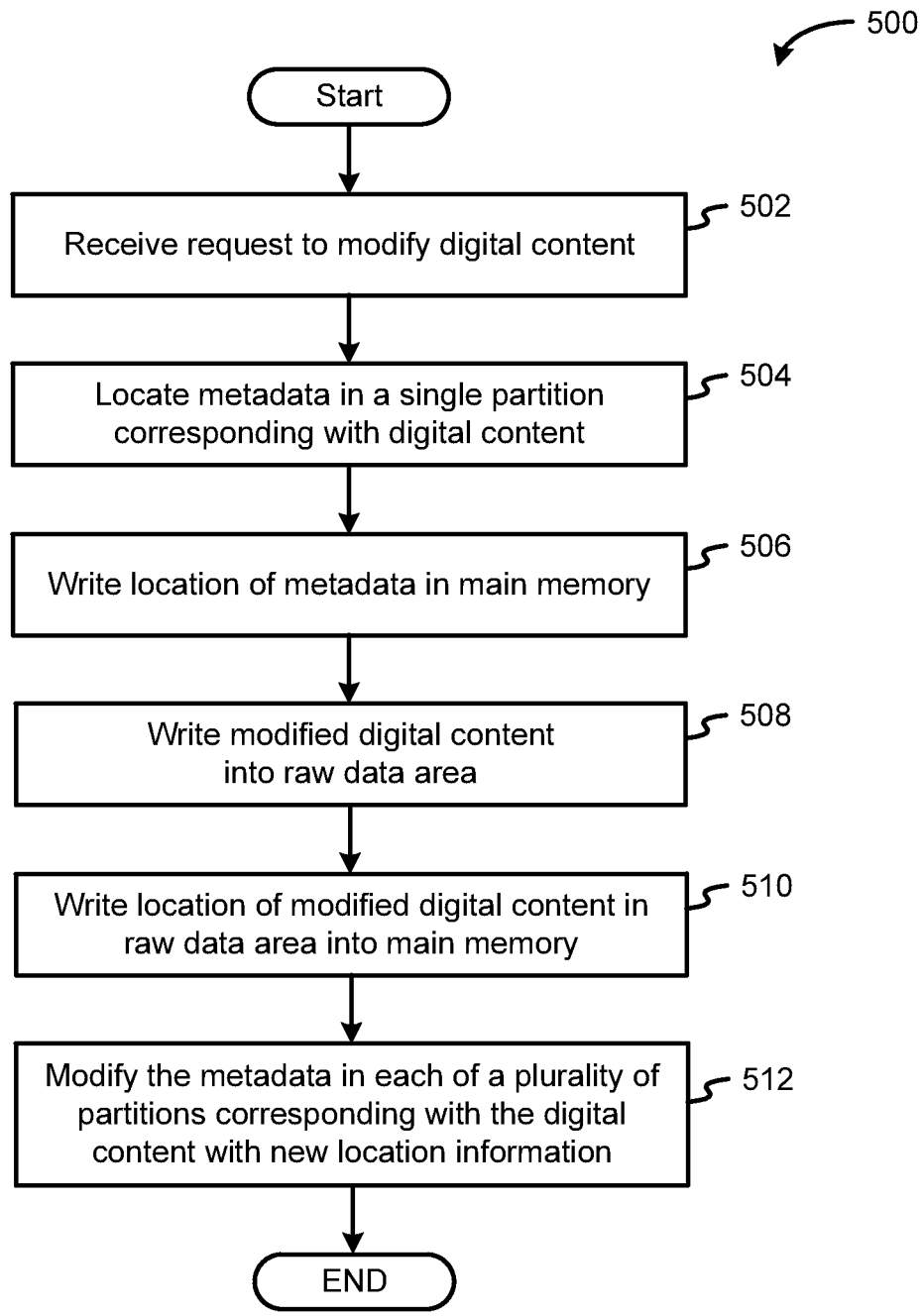
FIG. 8 is a schematic flow diagram illustrating yet another embodiment of a method for managing files.

Referring to FIG. 8, one embodiment of a method 500 for managing files is shown. The method 500 can be associated with receiving updated raw data files or updates for raw data files, and replacing or updating previously stored raw data files. In one implementation, the method 500 can be executed by the file management system and associated modules and devices described and shown above. The method 500 starts by receiving a request to modify a digital content or raw data file at 502. The request can include the modifications to the digital content file or a modified digital content file itself. The method 500 then locates the metadata in a single partition, or multiple partitions, of a storage medium at 504 and writes the location(s) (e.g., file path) of the metadata in a main memory at 506. Then, the method 500 writes the modified or updated digital content received at 502 to a raw data area of the storage medium at 508, and writes the location of the updated digital content in the raw data area to the main memory at 510. Additionally, the method 500 modifies the metadata corresponding with the updated digital content in each of a plurality of partitions to reflect the new location of the updated digital content in the raw data area at 512 based on the location of the modified digital content written to the main memory, and the method ends.

As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the program code may be stored and/or propagated on in one or more computer readable medium(s).

The computer readable medium may be a tangible computer readable storage medium storing the program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable storage medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store program code for use by and/or in connection with an instruction execution system, apparatus, or device.

The computer readable medium may also be a computer readable signal medium. A computer readable signal medium may include a propagated data signal with program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport program code for use by or in connection with an instruction execution system, apparatus, or device. Program code embodied on a computer readable signal medium may be transmitted using any appropriate medium, including but not limited to wire-line, optical fiber, Radio Frequency (RF), or the like, or any suitable combination of the foregoing In one embodiment, the computer readable medium may comprise a combination of one or more computer readable storage mediums and one or more computer readable signal mediums. For example, program code may be both propagated as an electro-magnetic signal through a fiber optic cable for execution by a processor and stored on RAM storage device for execution by the processor.

Program code for carrying out operations for aspects of the present invention may be written in any combination of one or more programming languages, including an object oriented programming language such as Java, Smalltalk, C++, PHP or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The computer program product may be shared, simultaneously serving multiple customers in a flexible, automated fashion. The computer program product may be standardized, requiring little customization and scalable, providing capacity on demand in a pay-as-you-go model.

The computer program product may be stored on a shared file system accessible from one or more servers. The computer program product may be executed via transactions that contain data and server processing requests that use Central Processor Unit (CPU) units on the accessed server. CPU units may be units of time such as minutes, seconds, hours on the central processor of the server. Additionally the accessed server may make requests of other servers that require CPU units. CPU units are an example that represents but one measurement of use. Other measurements of use include but are not limited to network bandwidth, memory usage, storage usage, packet transfers, complete transactions etc.

Aspects of the embodiments may be described above with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by program code. The program code may be provided to a processor of a general purpose computer, special purpose computer, sequencer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The program code may also be loaded onto a computer, other programmable data processing apparatus, or other devices to cause a series of operational steps to be performed on the computer, other programmable apparatus or other devices to produce a computer implemented process such that the program code which executed on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

The present subject matter may be embodied in other specific forms without departing from its spirit or essential characteristics. The described embodiments are to be considered in all respects only as illustrative and not restrictive. All changes which come within the meaning and range of equivalency of the claims are to be embraced within their scope.

What is claimed is:

1. A storage medium for a file management system, comprising:
   an unformatted raw data area configured to store a plurality of raw data files at respective locations within the unformatted raw data area, the unformatted raw data area lacking a file system; and
   a formatted partitioned area, separate from the unformatted raw data area, comprising a plurality of partitions each associated with a different file system, wherein:
   each partition comprises a plurality of metadata files each corresponding with one of the plurality of raw data files;
   each metadata file comprises metadata configured to be read by a digital content locator module to access the corresponding one of the plurality of raw data files in the unformatted raw data area;
   each metadata file comprises a metadata file address having a form dictated by the corresponding file system; and
   no raw data files are stored to the formatted partitioned area.

2. The storage medium of claim 1, wherein the metadata of each metadata file comprises a location of the raw data file within the unformatted raw data area.

3. The storage medium of claim 2, wherein the location comprises a physical address of a starting point and an ending point of the raw data file within the unformatted raw data area.

4. The storage medium of claim 1, wherein a size of each partition varies based on the file system associated with the partition.

5. The storage medium of claim 1, wherein the file systems of the plurality of partitions are selected from a group consisting of universal disk format, file allocation table, and high performance.

6. The storage medium of claim 1, further comprising partition management blocks.

7. A file management system, comprising:
a storage device comprising a storage medium with an unformatted raw data area configured to store a raw data file, wherein the unformatted raw data area lacks a file system, the storage device also includes a formatted partitioned area, separate from the unformatted raw data area, comprising a first partition with a first file system and a second partition with a second file system different than the first file system, wherein:
the first partition stores a first metadata file comprising metadata regarding the raw data file;
the second partition stores a second metadata file comprising metadata regarding the raw data file;
at least one of the first metadata file and the second metadata file is configured to be read by a digital content locator module to access the raw data file in the unformatted raw data area; and
each of the first and second metadata files comprises a corresponding metadata file address having a form specific to the corresponding one of the first partition and the second partition; and
a digital content player that executes the raw data file, the digital content player configured to determine a location of the raw data file within the unformatted raw data area based on one of the first and second metadata files read by the digital content locator module.

8. The file management system of claim 7, wherein:
the digital content player is incapable of reading files from the second file system; and
the digital content player is further configured to determine the location of the raw data file within the unformatted raw data area based on the first metadata file.

9. The file management system of claim 8, wherein the digital content player is a first digital content player configured to determine the location of the raw data file within the unformatted raw data area based on the first metadata file, the file management system further comprising a second digital content player that plays the raw data file, wherein the second digital content player is incapable of reading files from the first file system and is configured to determine the location of the raw data file within the unformatted raw data area based on the second metadata file.

10. The file management system of claim 7, wherein the metadata of the first metadata file stored on the first partition and the metadata of the second metadata file stored on the second partition corresponds to the same raw data file within the unformatted raw data area.

11. The file management system of claim 7, wherein the metadata regarding the raw data file of the first and second metadata files comprises a starting point and an ending point of the raw data file within the unformatted raw data area.

12. The file management system of claim 7, further comprising a digital content manager that is configured to:
store the raw data file in the unformatted raw data area;
generate the first and second metadata files; and
store the first and second metadata files in the first and second partitions, respectively.

13. The file management system of claim 12, wherein the digital content manager is further configured to:
format the first partition according to the first file system; and
format the second partition according to the second file system.

14. A method for managing files, comprising:
parsing a partition of a plurality of partitions formatted into a storage medium, each partition formatted according to a different file system;
locating a metadata file stored in the partition, the metadata file comprising a metadata file address having a form associated with the corresponding file system, the metadata file configured to be read by a digital content locator to identify a raw data file corresponding to the metadata file;
obtaining a location in an unformatted area of the storage medium of the raw data file from the metadata file; and
reading the raw data file from the unformatted area of the storage medium, wherein the unformatted area lacks a file system and is separate from the plurality of partitions.

15. The method of claim 14, wherein each partition of the plurality of partitions comprises a corresponding metadata file, each corresponding metadata file comprising the location, in the unformatted area of the storage medium, of the raw data file.

16. The method of claim 14, further comprising receiving a request to read the raw data file from a digital content player, the digital content player capable of parsing the file system of the partition of the plurality of partitions, but incapable of parsing the file system of at least another of the partitions of the plurality of partitions.

17. The method of claim 14, further comprising selecting the partition to parse from the plurality of partitions based on the file system of the partition.

18. The method of claim 14, further comprising, prior to parsing the partition:
writing the raw data file into the unformatted area of the storage medium; and
writing a metadata file into each of the plurality of partitions according to the file system associated with each partition, wherein each metadata file comprises a starting point and an ending point of the raw data file in the unformatted area of the storage medium.

19. The method of claim 18, further comprising writing the starting point and ending point into a main memory before writing the metadata file into each of the plurality of partitions.

20. The method of claim 14, wherein the partition is a first partition and the metadata file is a first metadata file, the method further comprising:
parsing a second partition of the plurality of partitions;
locating a second metadata file stored in the second partition; and
obtaining the location in the unformatted area of the raw data file from the second metadata file.

21. The method of claim 14, further comprising:
writing a location of the metadata file into a main memory of the storage medium;
writing an updated raw data file into the unformatted area, the updated raw data file comprising an update to the raw data file;
writing a location of the updated raw data file in the unformatted area into the main memory; and
modifying the metadata file to reflect the location of the updated raw data file in the unformatted area based on the location of the metadata file written into the main memory.

* * * * *